United States Patent

Rabow

[15] 3,643,172

[45] Feb. 15, 1972

[54] FREQUENCY MODULATION DEMODULATION SYSTEM

[72] Inventor: Gerald Rabow, Nutley, N.J.

[73] Assignee: International Telephone and Telegraph Corporation, Nutley, N.J.

[22] Filed: Mar. 18, 1969

[21] Appl. No.: 808,116

[52] U.S. Cl. ..........329/112, 329/145

[51] Int. Cl. ..........H03d 3/00

[58] Field of Search ..........325/345, 349, 423, 45; 329/112, 122, 50, 145, 146, 168

[56] References Cited

UNITED STATES PATENTS 3,206,681 9/1965 Brown..........325/423 X

*Primary Examiner*—Roy Lake
*Assistant Examiner*—Lawrence J. Dahl
*Attorney*—C. Cornell Remsen, Jr., Walter J. Baum, Percy P. Lantzy, Philip M. Bolton, Isidore Togut and Charles L. Johnson, Jr.

[57] ABSTRACT

An iterative-type FM demodulator comprises a first FMFB demodulator coupled to the original input signal. The output of the first demodulator is coupled to modulate a voltage-controlled oscillator. The oscillator output is mixed with the original input signal. The resultant output of the mixer is demodulated by a second FM demodulator which may be of the feedback type. The output of the second demodulator is added as a correction signal to the output of the first demodulator to provide the desired system output signal. This system has greater threshold extension than obtainable with presently employed FMFB demodulator. The circuit arrangement coupled to the output of the first demodulator may be repeated a number of times and coupled in cascade with each other to provide a further threshold extension.

10 Claims, 10 Drawing Figures

INVENTOR
GERALD RABOW
BY Alfred C. Hill
AGENT

INVENTOR
GERALD RABOW
BY Alfred C. Hill
AGENT

INVENTOR
GERALD RABOW
BY Alfred C. Hill
AGENT

FREQUENCY MODULATION DEMODULATION SYSTEM

BACKGROUND OF THE INVENTION

This invention relates to frequency modulation (FM) receivers and more particularly to threshold extending FM demodulators employed therein.

One of the principal problems faced in the design of long range communication systems involves the recovery of modulated signals of relatively low amplitude from a relatively high amplitude of background noise which may result from sources either external to or within the receiver itself. This problem is of paramount importance, for example, in over-the-horizon communication systems, in communication systems employing space satellites as terminal or repeater stations, and in other broadband microwave systems in which the power available in the modulated signal applied to the receiver is limited by other considerations.

It is well known that increases in the signal-to-noise ratio of the demodulated signal can be obtained only by virtue of making a trade between such performance and the radiofrequency bandwidth required for the transmission of the base band or communication signal.

Transmission by FM represents one example of this trade. It is generally accepted that the greater the deviation of the carrier wave, the higher the signal-to-noise performance of the receiver may be. This process, however, cannot be carried out indefinitely and a threshold is reached at which any further increase in the deviation, and thus in the bandwidth required in the radio frequency spectrum, is ineffective to improve the signal-to-noise performance.

A special form of FM receiver has been disclosed by J. G. Chaffee in U.S. Pat. No. 2,075,503, Mar. 30, 1937, and, variously referred to as a frequency modulation with feedback (FMFB) demodulator, as a frequency compression demodulator or a Chaffee-loop demodulator. This special form of receiver includes conventional frequency modulation receiver circuits, such as a radio frequency amplifier, a mixer and voltage-controlled oscillator, an IF amplifier, a limiter, frequency discriminator and base band amplified with the addition of a base band filter coupled between the output of the frequency discriminator and the voltage-controlled oscillator. Briefly, in this type of receiver the frequency of the local oscillator is caused by the feedback circuit to follow variations in the demodulated signal wave. This has the effect of reducing the modulation index at the input of the intermediate frequency amplifier and will improve the signal-to-noise performance. Although it would appear that the feedback process could continue indefinitely with ever better results, this receiver, also, has a threshold beyond which signal-to-noise improvement does not occur.

As has been recognized in the prior art literature, the amount of a threshold extension obtainable from the Chaffee-loop technique is limited and existing designs of the implementation thereof together with efforts to optimize the various components of the FMFB demodulator and associated receiver components have approached this limit, but will not exceed this limit.

SUMMARY OF THE INVENTION

Therefore, an object of this invention is to provide a new FM demodulator providing an amount of threshold extension greater than the amount of threshold extension possible with the conventional Chaffee-loop or FMFB demodulator.

Another object of this invention is to provide an iterative FM demodulator which enables a greater amount of threshold extension than that obtainable with a conventional FMFB type demodulator.

A feature of this invention is the provision of an FM demodulated system comprising an input for a frequency-modulated signal to be demodulated; a first FM demodulator (which may be of the feedback type) coupled to the input; and a first iteration circuit including first means coupled to the input and the output of the first demodulator to combine the output signals thereof, a second frequency modulation demodulator coupled to the output of the first means, and second means coupled to the output of each of the first and second demodulators to combine the output signals thereof and provide the demodulated output signal.

Another feature of this invention is the provision of connecting one or more iteration circuits in cascade to each other and the output of the first iteration circuit to achieve still a further increase in the amount of threshold extension obtainable.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENT

Figures 1, 2A, 2B, 2C, 2D:
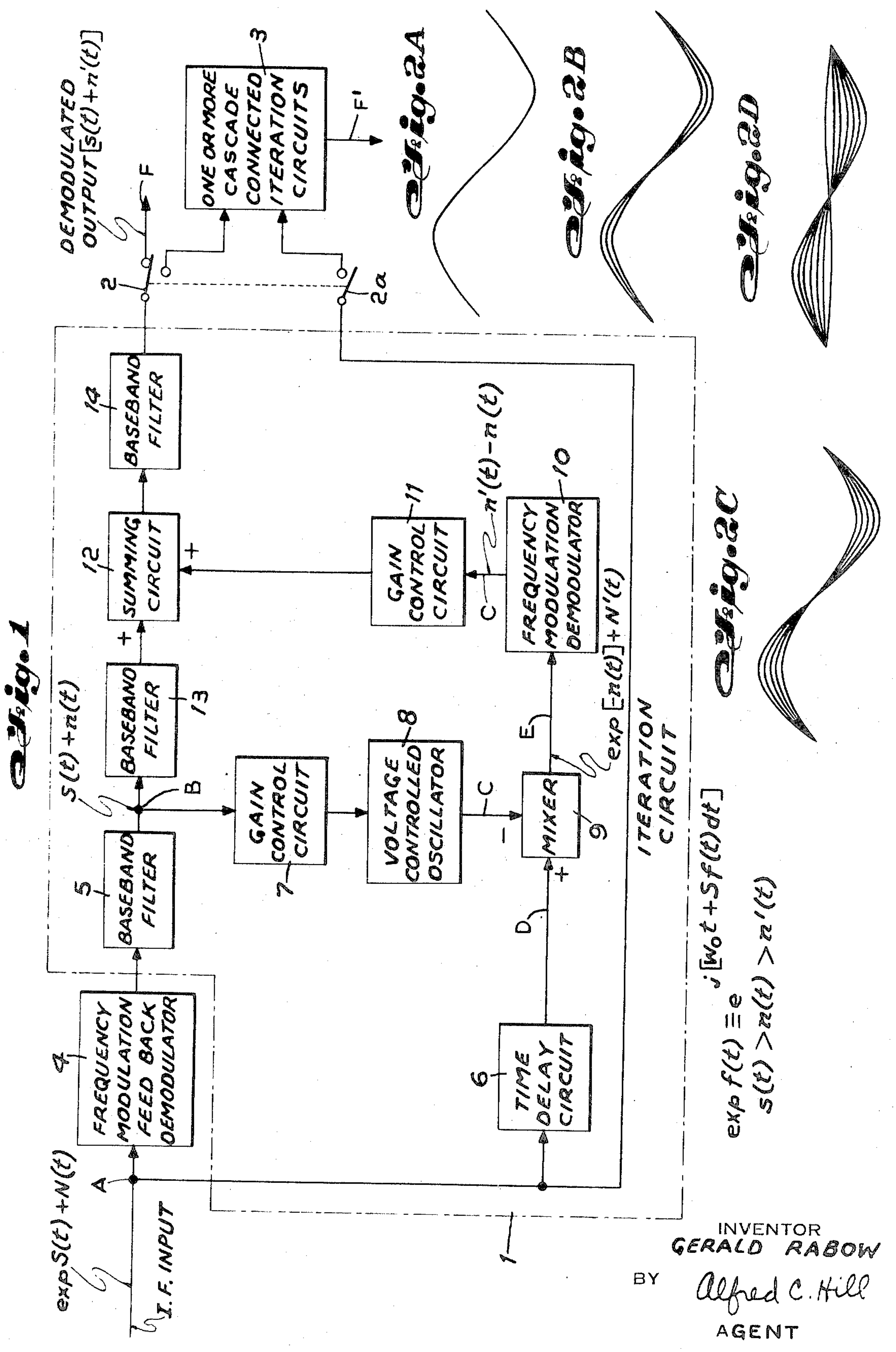
FIG. 1 is a block diagram of a threshold extending FM demodulator of the iterative type in accordance with the principles of this invention.
FIGS. 2A–2D are waveforms obtained by an oscilloscope coupled to point F of the circuit of FIG. 1 representing successively deteriorating waveforms as the noise is increased.

FIG. 1 discloses the details of a single iteration circuit 1 of an iterative demodulator in accordance with the present invention when switches 2 and 2*a* are in the position illustrated. However, when switches 2 and 2*a* are placed in its other position one or more iteration circuits, as represented by block 3, are connected in cascade with each other and circuit 1 to further increase the amount of threshold extension obtainable with the iterative type demodulator disclosed herein.

Before proceeding with the description of FIG. 1, a comparison of conventional FM demodulators, conventional FMFB demodulators and the iterative demodulator of this disclosure will be presented.

FM uses the available bandwidth to improve the quality of the output signal. An important parameter in FM systems is the modulation index B, which is defined as the ratio of frequency deviation to the base band bandwidth $f_a$. The bandwidth required to transmit the FM signal is usually taken to be $2(B+1f_a$ (1). A measure of the quality of the received processed signal is its signal-to-noise ratio, $S/N=3B^2(C/2KT f_a)$ (2) for sufficiently large $C$, where $C$ is the FM carrier power received, and $KT$ is the noise power density of the receiver. This expression is often written as $S/N=3B^3C/N$ for large $B$, where $N$ is the noise existing in the bandwidth defined by equation (1). If a signal quality $S/N$ is specified, as it usually is, it can be obtained through the proper selection of the carrier-to-noise density ratio $C/KT$ and bandwidth proportional to $(B+1)$. Therefore, the power required can be traded for bandwidth for an output of given quality.

There is a limit to how far this tradeoff can be carried. Below threshold, output quality deteriorates below that given by equation (2) so drastically that the system is no longer useful. In many applications, notably satellite communication systems, the tradeoff between power and bandwidth would make it very desirable to operate well below threshold, if only threshold deterioration did not exist. The object of demodulator design for such systems is, therefore, to make the value of $C/KT$ at which significant threshold deterioration occurs as low as possible.

Conventional FM discriminators have a threshold level on the order of $C/N=16$. This can be reduced in FMFB demodulators, where the modulation index into the discriminator, and, hence, the noise bandwidth can be reduced. If the modulation index is $B>>1$ and the feedback is $F>>1$, then the bandwidth of the IF filter prior to the discriminator can be approximately $2Bf_a/F$, the base band filter bandwidth $f_a$, and the closed loop bandwidth $Ff_a$. If a threshold comparable to that required for the discriminator must also be maintained for the closed loop response, as seems in accord with the literature and with attained performance, than the optimum $F$ and the improvement in threshold power that can be realized through conventional FMFB demodulators, with respect to the basic FM demodulator, are both on the order of $\sqrt{B}$.

One technique which permits going beyond the threshold improvement capabilities of the conventional FMFB demodulators is an iterative technique using several FM demodulators. The first demodulator in the iterative technique is a conventional FMFB demodulator, which instead of requiring an input $C/KT$ which causes only a small degradation with respect to equation (1), allows the signal-to-noise ratio to be degraded considerably, in the limit to just above unity. In a typical FMFB demodulator, the difference in $C/KT$ between the threshold region and the point of unity signal-to-noise ratio is about 6 or 7 db. (decibel). Successful iterations raise the signal-to-noise ratio up to the threshold.

A typical iteration is achieved as follows: the output to be improved X is used to modulate a voltage-controlled oscillator whose output is then mixed with the original carrier so as to remove from it the FM represented by X. The residual modulation $y$ is then detected in another FM demodulator, which may be of the FMFB type if required. The output of this second demodulator is then added to the output of the first demodulator as a correction signal to X. The resultant output X+$y$ will have a better signal-to-noise ratio than X because the error in X+$y$ is the error in $y$ in failing to achieve perfect correction. The error in $y$ is less than the error in X because the residual modulation $y$ has a lower modulation index than that used for obtaining X, thus, allowing narrower noise filters (low-pass filters) in the feedback loop of the second demodulator.

The simplest iterative demodulation system is one containing a single iteration, and this iteration is achieved by the block diagram of the demodulation system of FIG. 1. A single iteration is capable or realizing the major portion of the 6 to 7 db. threshold improvement potentially available to iterative demodulation systems.

Referring now to FIG. 1, there is illustrated therein a one iteration iterative demodulator in accordance with the principles of the present invention. The IF input at point A consists of an FM carrier $S(t)$ + noise $N(t)$ which is applied to FMFB demodulator 4. The output of demodulator 4 is coupled to base band filter 5 which provides at output B the desired demodulated signal $S(t)$ contaminated by noise $n(t)$, where $S(t)$ is an order a magnitude greater than $n(t)$. Filter 5 is ideally a rectangular low-pass filter with a passband just equal to the base band, and with a delay characteristic so that the phase shift in the passband of the combination of modulator 4 and filter 5 is linear. The IF input is also applied through time delay circuit 6 whose delay just equals the delay of the combination of modulator 4 and filter 5. The signal at output B is coupled through gain control circuit 7 to modulate voltage control oscillator 8, the output C being coupled to mixer 9. The other input D of mixer 9 is the delayed IF input from time delay circuit 6. The gain control of circuit 7 is adjusted so that the signal component of mixer input C is just equal to the signal component of input D and, hence, cancels it. The output E of mixer 9 has just two components, one component is the original carrier, now modulated by $-n(t)$, and the other component is additive noise $N'(t)$. The additive noise has been somewhat transformed from $N(t)$ in passing through mixer 9, but is not altered in power spectral density.

Under conditions much above threshold, $n(t)$ results merely from the quadrature component of the noise. In mixer 9, it would then merely cancel the quadrature component of the noise at input D and the noise at output E would have no quadrature component and, hence, produce no output from frequency modulation demodulator 10 coupled to output E of mixer 9. The iterative demodulator output at point F when switch 2 is in the position illustrated is, hence, essentially uncharged from the output of the conventional FMFB demodulator 4 at output B when operating far above threshold.

The region of interest for the iterative demodulator, however, is where demodulator 4 is operating below threshold. The noise term $n(t)$ becomes dominated by threshold noise, and it is the plan to detect this threshold noise in demodulator 10 and eventually subtract it from the signal at output B. The problem then becomes to detect $-n(t)$ in demodulator 10 with less threshold noise than in demodulator 4. This can be done, since modulation $n(t)$ is an order of magnitude less than $S(t)$ and demodulator 10 can be designed with narrower IF filters. Demodulator 10 may or may not be of the feedback type depending on the requirements.

The output G of demodulator 10 will be the desired $-n(t)$ corrupted by some noise $n'(t)$, which should be at least an order of magnitude smaller than $n(t)$ at threshold operation of the iterative demodulator. The output signal at G of demodulator 10 is coupled through gain control circuit 8 to one input of summing circuit 12. The signal at output B, the output of filter 5, is coupled through base band filter 13 to the other input of summing circuit 12. The operation of summing circuit 12 is to eliminate noise $n(t)$. Gain control circuit 11 and base band filter 13 are set to obtain optimum cancellation of $n(t)$. Base band filter 13 matches the frequency response to $n(t)$ of demodulator 10. Finally, base band filter 14 coupled to the output of circuit 12 is a sharp cutoff low-pass filter to eliminate any part of $n'(t)$ not within the base band. In a multichannel FM system, filter 14 would be part of the demultiplexer.

The iterative demodulator of this invention has been described above with respect to iteration circuit 1 which provides a threshold extension greater than that obtainable with a conventional FMFB demodulator such as demodulator 4. A further extension of the threshold is possible within the principles of this invention by providing two, three, or more iteration circuits. This is illustrated in FIG. 1 by block 3 which represents one or more iteration circuits coupled in cascade with each other at points corresponding to output F and iteration circuit 1 with the demodulated signal be provided at output F′ of the last iteration circuit of block 3. Output F′ corresponds to the output of a base band filter similar to filter 14. Block 3 is placed in operation when switches 2 and 2*a* are moved to its other position. The components of these additional iteration circuits are identical to the components of iteration circuit 1, but differ therefrom in (1) the bandwidth of the base band filters corresponding to filters 5, 13 and 14; (2) the bandwidth of the loop filters of the demodulator corresponding to demodulator 10, if it is of the feedback type; (3) the bandwidth of the IF filters of the demodulator corresponding to demodulator 10; (4) the amount of gain in the gain control circuits corresponding to circuits 7 and 11; and (5) the amount of delay in a time delay circuit corresponding to circuit 6.

The system of FIG. 1 has been tested and certain results obtained that demonstrate the increased amount of threshold extension obtainable with the iterative type demodulator of the present invention over and above that obtained by conventional FMFB demodulators. FIGS. 2A–2D are waveforms obtained by an oscilloscope coupled to point F, the demodulator system output. These waveforms represent successively deteriorating waveforms as the noise is increased where FIG. 2A shows a clean output, FIGS. 2B and 2C show successively lower output signal-to-noise ratio and FIG. 2D shows not only noise but also loss of part of the signal. These waveforms were taken first without the correction signal from demodulator 10 and, thus, the output observed was that of a conventional FMFB. However, when the correction output of demodulator 10 was incorporated in the test setup a noticeable improvement was observed, the improvement being represented by observing the waveform FIG. 2B when the iterative demodulator 10 was incorporated rather than the waveform 2C when the iterative demodulation was not in the test circuit.

Figures 3A, 3B, 4A:
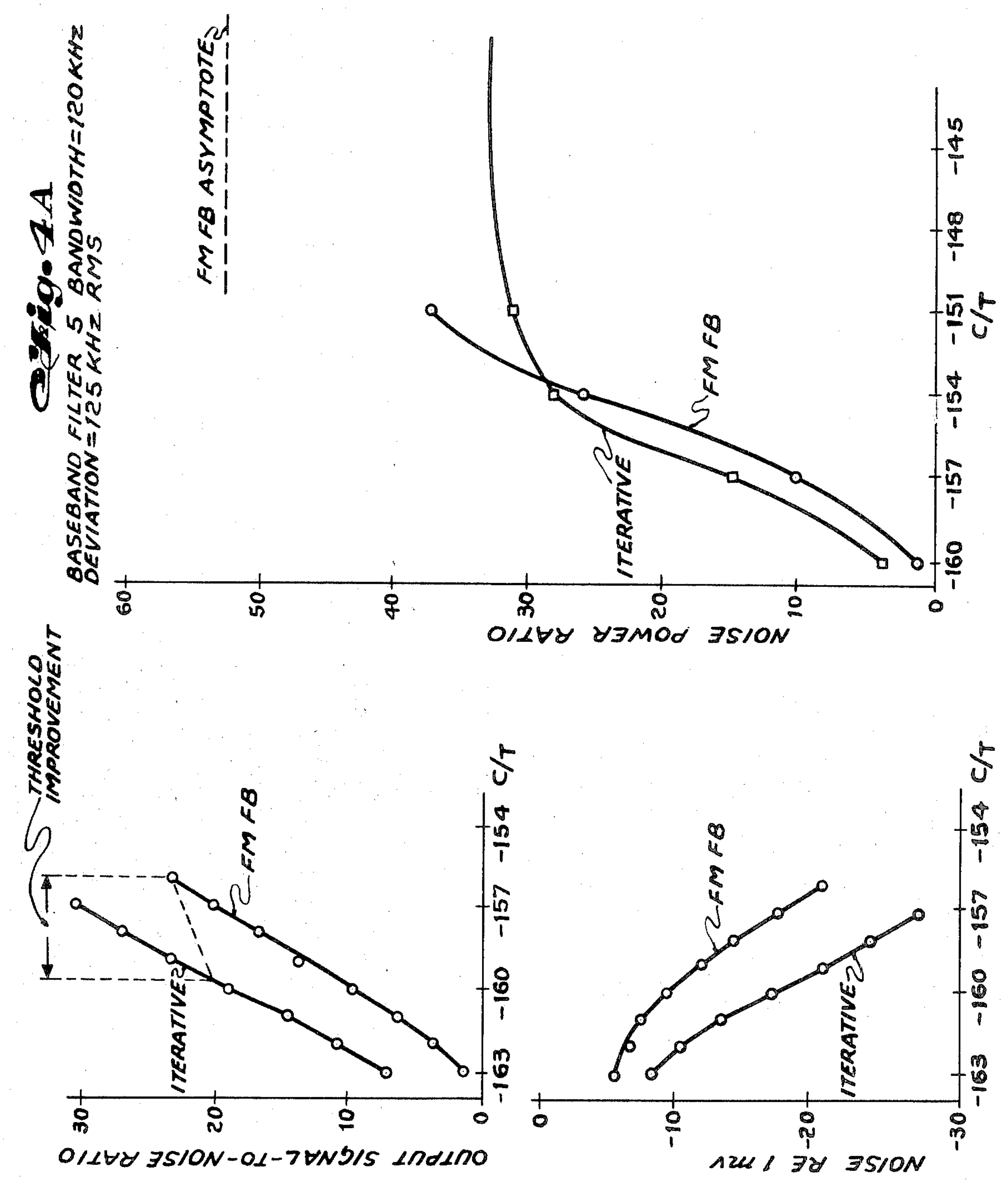
FIGS. 3A, 3B, 4A, 4B, and 4C are graphs illustrating test results for various conditions of signals applied to the demodulator of FIG. 1.

The results obtained qualitatively by observing the oscilloscope were then verified quantatively through the use of an RMS (root mean square) voltmeter. One run of output noise on the voltmeter versus input carrier-to-noise temperature (*C/T*) with zero modulation was taken for the iterative and conventional demodulators and the results are plotted as illustrated in FIG. 3A. Another run of signal plus noise output versus *C/T* was taken with a sine wave modulation having a deviation equal to 180 kHz. peak. It was assumed that the noise contribution in this run was the same as the noise obtained in the previous run with no modulation and the signal-to-noise output versus *C/T* was calculated and is plotted in FIG. 3B.

The other test performed on the system was for noise power ratio. In this test, the modulation was base band noise to a frequency of 108 kHz. with an RMS deviation of 125 kHz. The noise power ratio was measured as the ratio of power obtained in a 4 kHz. band around 40 kHz. for normal noise modulation and for the modulation with the 40 kHz. band notched out. The resultant curves for the conventional FMFB and iterative demodulators are shown in FIG. 4A.

Figures 4B, 4C:
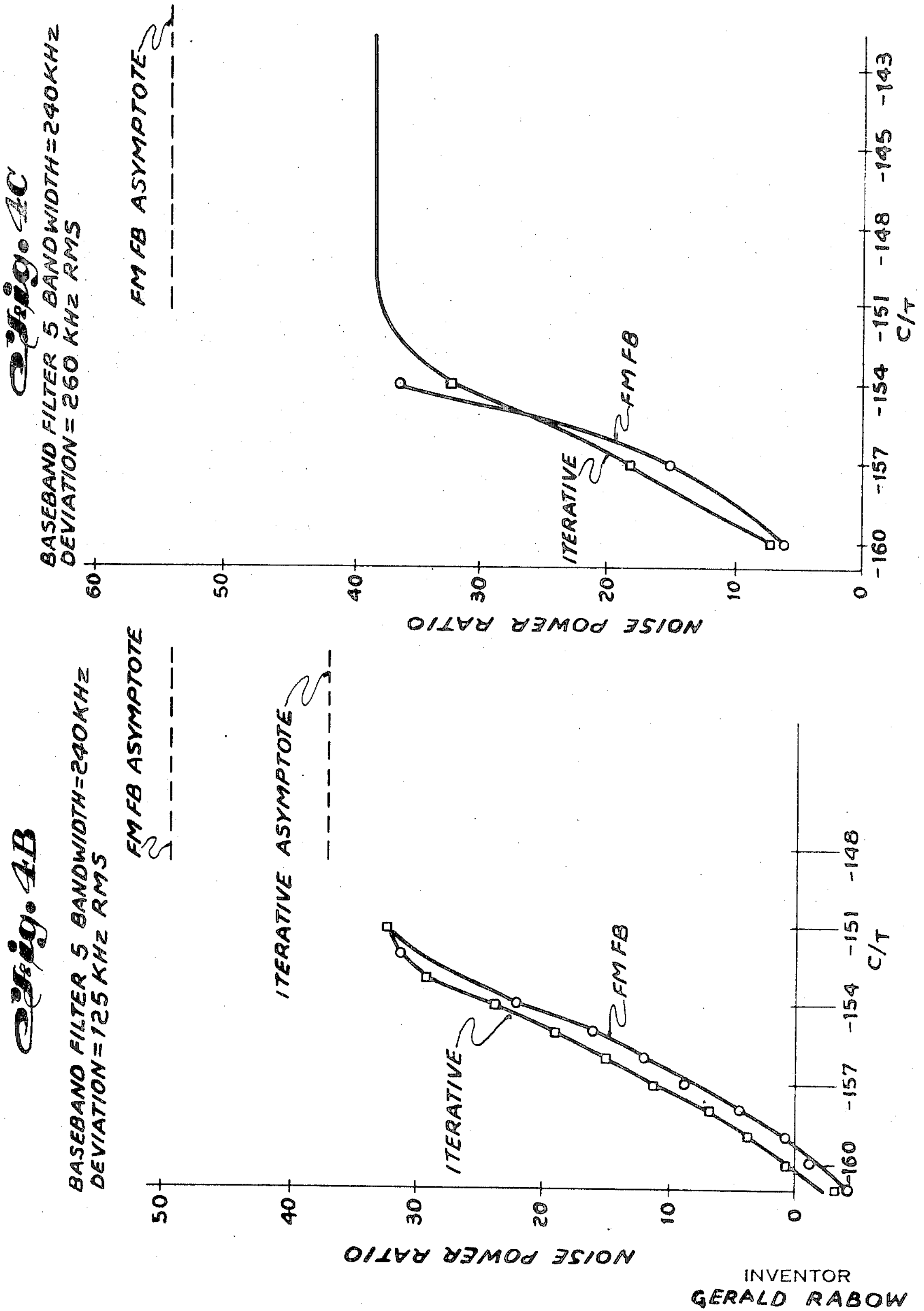

FIG. 4B shows the results of the test repeated with the bandwidth of filter 5 changed to 240 kHz. and FIG. 4C shows the results of the test repeated with the bandwidth of filter 5 at 240 kHz. and where the deviation was increased to 260 kHz.

In evaluating the results of these tests as illustrated in the curves of FIGS. 3A, 3B, and 4A–4C, it should be first noted that there is an improvement in performances for the iterative modulator over at least some range of *C/T* relative to the conventional FMFB demodulator in each test. Since most measurement errors cancel out in obtaining relative performance, values obtained for the differences are quite real. However, the results of FIGS. 3A and 3B show an improvement in *C/T* for a fixed output signal-to-noise ratio of as much as 3 db. which corresponds to a threshold improvement of 3.7 db. The corresponding improvement in output signal-to-noise for fixed *C/T* is about 10 db.

Of the noise power ratio test, the one intended to show the improvement of the iterative demodulator is FIG. 4A, and this shows an improvement of better than 1 db. to the point where the iterative performance is limited by intermodulation. FIG. 4B shows that the intermodulation of the iterative demodulator can be improved by reducing the phase shift of base band filter 5, thus improving the cancellation of the original modulation in mixer 9, and still show some advantage. FIG. 4C shows that the deviation can be increased to beyond the bandwidth of filter 5 and still shows some improvement for the iterative demodulator over the conventional FMFB demodulator.

In summary, the tests show in the ad hoc equipment tested that there is at least a 3 db. improvement in threshold *C/T* to be gained through the iterative demodulator relative to the threshold obtainable with a conventional FMFB demodulator.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frequency modulation demodulation system comprising:
   - an input for a frequency-modulated signal to be demodulated;
   - a first frequency modulation demodulator coupled to said input; and
   - a first iteration circuit including
     - a voltage-controlled oscillator coupled to the output of said first demodulator,
     - first means coupled to said input and the output of said oscillator to combine the output signals thereof,
     - a second frequency modulation demodulator coupled to the output of said first means, and
     - second means coupled to the output of each of said first and second demodulators to combine the output signals thereof and provide the demodulated output signal.

2. A system according to claim 1, wherein said first demodulator is of the feedback type.

3. A system according to claim 1, wherein said second demodulator is of the feedback type.

4. A system according to claim 1, further including at least one other iteration circuit substantially identical to said first iteration circuit coupled in cascade with said first iteration circuit to provide said demodulated output signal.

5. A system according to claim 1, further including a plurality of iteration circuits each substantially identical to said first iteration circuits coupled in cascade with each other and said first iteration circuit to provide said demodulated output signal.

6. A system according to claim 1, wherein said first means includes
   - a mixer coupled to said input and the output of said oscillator.

7. A system according to claim 6, wherein said first means further includes
   - a time delay means coupled between said input and said mixer; and said first iteration circuit further includes
   - a base band filter coupled to the output of said first demodulator, and
   - a gain control means coupled between the output of said base band filter and the input of said oscillator.

8. A system according to claim 1, wherein said second means includes
   - a summing circuit coupled to the output of each of said first and second demodulators.

9. A system according to claim 8, wherein said second means further includes
   - a first base band filter coupled between the output of said first demodulator and one input of said summing circuit,
   - a gain control means coupled between the output of said second demodulator and another input of said summing circuit; and
   - a second base band filter coupled to the output of said summing circuit to provide said demodulated output signal.

10. A system according to claim 1, wherein said first iteration circuit further includes
   - a first base band filter coupled to the output of said first demodulator, and
   - a first gain control means coupled between the output of said first filter and the input of said oscillator; and said first means includes
   - a time delay means coupled to said input, and
   - a mixer having one input coupled to the output of said delay means, another input coupled to the output of said oscillator, and its output coupled to the input of said second demodulator; and said second means includes
   - a second band pass filter coupled to the output of said first filter,
   - a second gain control means coupled to the output of said second demodulator,
   - a summing circuit having one input coupled to the output of said second filter and another input coupled to the output of said second gain control means, and
   - a third band-pass filter coupled to the output of said summing circuit to provide said demodulated output signal.

* * * * *